United States Patent [19]
Chenevey

[11] Patent Number: 4,554,119
[45] Date of Patent: Nov. 19, 1985

[54] PROCESS FOR HEAT TREATING SHAPED ARTICLES OF POLY {[BENZO(1,2-D:4,5-D')BISTHIAZOLE-2,6-DIYL]-1,4-PHENYLENE}, ITS CIS ISOMER OR MIXTURES THEREOF

[75] Inventor: Edward C. Chenevey, North Plainfield, N.J.

[73] Assignee: Celanese Corporation, New York, N.Y.

[21] Appl. No.: 483,799

[22] Filed: Apr. 11, 1983

[51] Int. Cl.$^4$ ............................................. B29C 25/00
[52] U.S. Cl. ..................................... 264/85; 264/184; 264/210.8; 264/331.12; 264/345; 525/425; 528/179; 528/183
[58] Field of Search ................ 264/184, 210.8, 331.12, 264/85, 345; 528/179, 183; 525/425

[56] References Cited

U.S. PATENT DOCUMENTS 4,202,962  5/1980  Bauch .............................. 264/176 F
4,377,546  3/1983  Helminiak et al. ............. 264/331.12
4,423,202 12/1983  Choe .................................. 528/179

Primary Examiner—Jeffery Thurlow
Attorney, Agent, or Firm—Burns, Doane, Swecker & Mathis

[57] ABSTRACT

The properties of shaped articles of poly {[benzo(1,2-d:4,5-d')bisthiazole-2,6-diyl]-1,4-phenylene}, its cis isomer and mixtures thereof are improved by a process of heat treatment under tension. The articles may be prepared from a dope obtained by dissolving the formed polymer in an appropriate solvent or by forming the polymer under conditions which enable the article to be prepared directly from the reaction medium.

12 Claims, No Drawings

PROCESS FOR HEAT TREATING SHAPED ARTICLES OF POLY {[BENZO(1,2-D:4,5-D')BISTHIAZOLE-2,6-DIYL]-1,4-PHENYLENE}, ITS CIS ISOMER OR MIXTURES THEREOF

BACKGROUND OF THE INVENTION

1. Field of the Invention

This invention relates to a process for heat treating shaped articles of poly {[benzo(1,2-d:4,5-d')bisthiazole-2,6-diyl]-1,4-phenylene}, its cis isomer or mixtures thereof and to the articles formed by the process.

2. Description of the Prior Art

The preparation of shaped articles such as fibers, filaments, yarns and films composed of polybenzothiazoles is known in the art. In U.S. Pat. No. 3,681,297, a selected dialdehyde is reacted with a defined aromatic bismercaptoamine to obtain a polybenzothiazoline. This material is then subjected to oxidation to obtain the related polybenzothiazole. In the event that unconverted reactants remain, the patent discloses that the polymer may be heated in excess of 175° C., preferably in the range of 250°–400° C. in nitrogen or 250°–350° C. in air to cause chain extending polymerization.

In U.S. Pat. No. 4,051,108, two-dimensional microscopic sheets or coatings are formed by initially dissolving a formed para ordered aromatic heterocyclic polymer in a polymer solution such as methanesulfonic acid. The polymer solution is added to a non-solvent for the polymer thereby causing the polymer to precipitate. The polymer particles are collected by filtration, such as by using a fritted glass filter, or by dipping an object in the dispersion. Evaporation of the solvent can be accelerated by employing a forced air oven. A similar technique is described in U.S. Pat. No. 3,987,015.

In U.S. Pat. No. 3,313,783, high molecular weight polybenzimidazoles are prepared by reacting at least one inorganic acid salt of an aromatic tetra-primary amine and at least one dicarboxylic acid or derivative thereof in a polyphosphoric acid medium at an elevated temperature in the range of from 100° to 250° C.

In U.S. Pat. No. 4,225,700, poly {[benzo(1,2-d:4,5-d')bisthiazole-2,6-diyl]-1,4-phenylene} is prepared by reacting 2,5-diamino-1,4-benzenedithiol dihydrochloride with terephthalic acid in polyphosphoric acid.

It is also known in the art to heat treat articles made of distinctive types of polymeric materials. Thus, in U.S. Pat. Nos. 3,975,487, 4,183,895 and 4,247,514, articles composed of aromatic polyesters are heat treated whereas in U.S. Pat. Nos. 3,671,542 and 3,574,170, aromatic polyamides and poly(bisbenzimidazolbenzophenanthroline), respectively, are heat treated. U.S. Pat. No. 3,574,170 also refers to a concurrently filed U.S. application Ser. No. 867,880 (now abandoned), which application describes a process for preparing shaped articles of the specified polymer by direct extrusion of the polymerization medium into a coagulation bath. Similarly, wholly aromatic carbocyclic polycarbonamide shaped articles may be prepared from the polymerization medium as disclosed, for example, in U.S. Pat. No. 3,819,587. However, no known prior art discloses or suggests that articles prepared from poly{[benzo(1,2-d:4,5-d')bisthiazole-2,6-diyl]-1,4-phenylene}, its cis isomer and mixtures thereof may be heat treated in accordance with the present invention to obtain the significant advantages described hereafter.

In application Ser. No. 483,798 filed concurrently herewith by Edward C. Chenevey and Thaddeus E. Helminiak, entitled "Process for Preparing Shaped Articles of Rigid Rod Heterocyclic Liquid Crystalline Polymers" and assigned to the assignee of the present application, there is described a process for preparing shaped articles of polymers such as poly{[benzo(1,2-d:4,5-d')bisthiazole-2,6-diyl]-1,4-phenylene} by polymerizing the reactants in a reaction medium and directly forming the shaped articles therefrom.

In application Ser. No. 483,797 filed concurrently herewith by Edward C. Cheveney and Ronald Kafchinski, entitled "Process for Preparing Film of Poly{[benzo(1,2-d:4,5-d')bisthiazole-2,6-diyl]-1,4-phenylene}; Its Cis Isomer or Mixtures Thereof" and assigned to the assignee of present application, there is described a process for preparing a film of the polymer by extruding it on a casting roll, subjecting it to an elevated temperature and, preferably, heat treating it.

OBJECTS AND SUMMARY OF THE INVENTION

Accordingly, it is a general object of the present invention to provide a novel process of heat treating articles of poly{[benzo(1,2-d:4,5-d')bisthiazole-2,6-diyl]-1,4-phenylene}, its cis isomer or mixtures thereof.

It is another object of the present invention to provide a novel process of heat treating articles of poly{[benzo(1,2-d:4,5-d')bisthiazole-2,6-diyl]-1,4-phenylene}, its cis isomer or mixtures thereof to obtain improved tenacity, elongation and modulus.

It is a still further object of the present invention to provide a novel process of heat treating articles of poly{[benzo(1,2-d:4,5-d')bisthiazole-2,6-diyl]-1,4-phenylene}, its cis isomer or mixtures thereof whereby improved properties are obtained in relatively short times.

It is yet a further object of this invention to provide articles having improved properties which are formed by the heat treating process of the present invention.

These and other objects, as well as the scope, nature and utilization of the invention will be apparent from the following summary and detailed description of the present invention.

In accordance with one aspect; the present invention provides a process for heat treating a shaped article of poly{[benzo(1,2-d:4,5-d')bisthiazole-2,6-diyl]-1,4-phenylene}, its cis isomer or mixtures thereof. The process comprises:

(a) heating the article to a temperature in the range of from about 375° to about 650° C.;

(b) stretching the article to obtain a stretch of from about 0.5 to about 6%; and (c) maintaining the article under the conditions of (a) and (b) for from about 5 to about 300 seconds.

In another aspect, the present invention provides a process for preparing heat treated shaped articles of poly{[benzo(1,2-d:4,5-d')bisthiazole-2,6-diyl]-1,4-phenylene]}, its cis isomer or mixtures thereof. The process comprises:

(a) dissolving

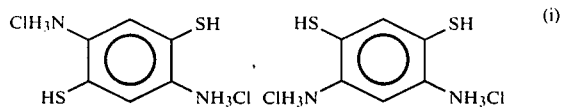

(i)

-continued
or mixtures thereof, and

(ii)

in polyphosphoric acid in about equimolar amounts of (i) and (ii);

(b) reacting (i) and (ii) at a temperature in the range of from about 150° to about 220° C. to obtain a polymer having the recurring unit

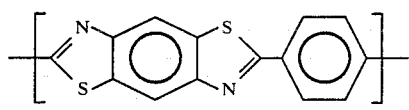

or

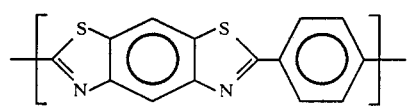

or mixtures thereof;

(c) forming a shaped article from the polymer;

(d) heating the article to a temperature in the range of from about 375° to about 650° C.;

(e) stretching the article to obtain a stretch of from about 0.5 to about 6%; and (f) maintaining the article under the conditions of (d) and (e) for from about 5 to about 300 seconds.

In a further aspect, the present invention provides a shaped article of poly{[benzo(1,2-d:4,5-d')-bisthiazole2,6-diyl]-1,4 -phenylene}, its cis isomer or mixtures thereof having improved properties.

DESCRIPTION OF THE PREFERRED EMBODIMENTS

As stated hereinabove, the present invention relates to a process of heat treating shaped articles of poly{[-benzo(1,2-d:4,5-d')bisthiazole-2,6-diyl]-1,4-phenylene}, its cis isomer or mixtures thereof hereinafter collectively referred to as "PBT". The term "shaped articles" typically refers to fibers, filaments, yarns and films of the polymer, but also includes articles which are amenable to the process of this invention.

In general, PBT is a rigid rod heterocyclic polymer which exhibits anisotropic properties in solution. In one aspect, the polymer has the recurring unit:

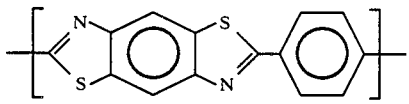

In another aspect, the polymer has the recurring unit:

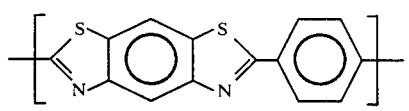

In a further aspect, the polymer is composed of mixture of the isomeric units. In this regard, the term "mixture" encompasses both the copolymer and the blend of the isomers. Of course, as should be apparent to those of ordinary skill in the art, the available hydrogen atoms on the aromatic rings may be substituted with halogen atoms and short chain alkyl and alkoxy groups which do not substantially adversely affect the characteristics of the polymer and the formal name, the designation "PBT" as well as the illustrated recurring units are to be understood as encompassing such polymers.

Preparation of the PBT may be undertaken by processes which yield sufficient quantities of substantially fully polymerized polymer. For example, PBT may be prepared by reacting:

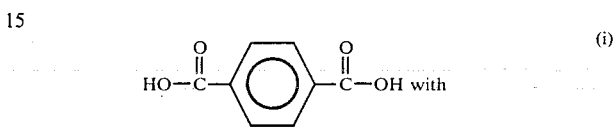
(i)

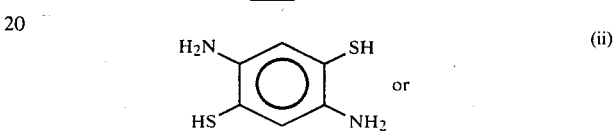
(ii)

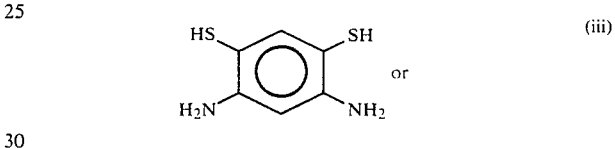
(iii)

mixtures thereof (iv)

in a suitable solvent, such as a liquid N,N-dialkylcarboxylamide. The reaction is usually carried out in an inert atmosphere, such as nitrogen. This results in the formation of a polybenzothiazoline having the recurring unit:

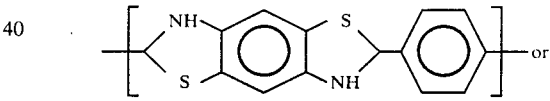
or

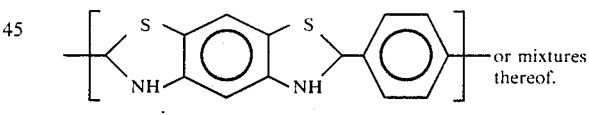
or mixtures thereof.

The polybenzothiazoline is then oxidized to form PBT.

Alternatively, the reaction may be carried out in the presence of a mild oxidizing agent, such as air, whereby PBT may be obtained without the need of a subsequent oxidation step. The polymer may then be formed into the desired shape. Additional details of these techniques of obtaining PBT are set forth in U.S. Pat. No. 3,681,297, the content of which is hereby incorporated by reference.

In a preferred embodiment, PBT is prepared from a reaction medium of polyphosphoric acid. Although polyphosphoric acid is available commercially, it may be synthesized by adding phosphorous pentoxide to orthophosphoric acid and heating the mixture. A more complete discussion of this procedure is set forth in U.S. Pat. No. 3,313,783, the content of which is incorporated by reference.

To prepare PBT in accordance with this technique, a monomer selected from the group consisting of 2,5- diamino-1,4-benzenedithiol dihydrochloride, 2,4-diamino-1,5-benzenedithiol dihydrochloride, halogenated, alkylated or alkoxylated derivatives thereof, and mixtures of the foregoing monomers, is dissolved in polyphosphoric acid with gentle heating (i.e., about 70° C.), to allow hydrogen chloride to escape. While other acid salts may be employed, the most preferred monomer is 2,5-diamino-1,4-benzenedithiol dihydrochloride. An equimolar amount of finely divided terephthalic acid (unsubstituted or substituted) is then added and uniformly dispersed throughout the reaction mixture. The amount of polyphosphoric acid employed is sufficient to obtain a solids content of from about 2 to about 20% by weight. More typically, sufficient polyphosphoric acid is employed to obtain a solids content therein of from about 7 to about 17% by weight.

The polymerization reaction is conducted at a temperature in the range of from about 150° to about 220° C., preferably from about 170° to about 200° C. Although the process will proceed under atmospheric conditions, the reaction is preferably undertaken in the substantial absence of oxygen. That is, the reaction is preferably performed in a substantially inert atmosphere at ambient pressure. Suitable materials which can be used to constitute the inert atmosphere include nitrogen, helium, argon, neon, krypton, carbon dioxide, and mixtures thereof with nitrogen being preferred. It will be readily understood that the reaction time to obtain substantially complete polymerization will vary depending on the reaction conditions. However, typically the reaction will require from about 12 to about 20 hours to obtain PBT which is 99.9% polymerized. Additional information relating to this technique may be found in U.S. Pat. No. 4,225,700, the content of which is incorporated by reference. The reaction mechanism of this technique using the trans isomer as an example is believed to be as follows:

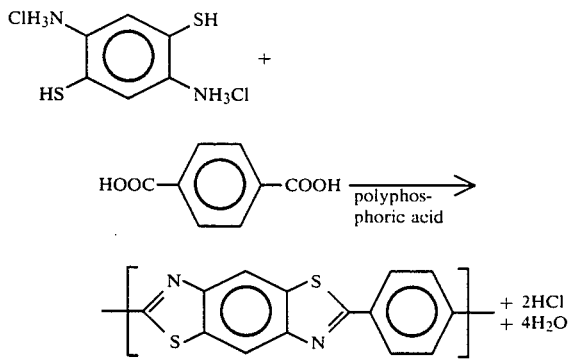

To obtain PBT with good properties, it is preferred that the reaction conditions be selected to obtain a polymer with as high a molecular weight as possible. Typically, the polymer should have an intrinsic viscosity of at least about 10, preferably at least about 14 dl./g. (determined in methanesulfonic acid at 25° C.). In this regard, while small amounts of other comonomers may be incorporated into the polymer chain, it is preferred that to maintain a high molecular weight, the pure polymer be obtained.

After the polymerization step, the PBT may be formed into shaped articles directly from the polyphosphoric acid reaction medium. This may be accomplished by such techniques as wet extrusion or dry jet extrusion at temperatures ranging from about 0° to about 200° C. and a pressure ranging from about 100 to about 10,000 p.s.i.g. into a coagulant for the polymer, such as water or aqueous solutions of methanesulfonic acid or phosphoric acid. Of course, if the PBT is formed by an alternative process, a polymer dope in a solvent such as methanesulfonic acid, polyphosphoric acid, chlorosulfonic acid, sulfuric acid, or mixtures thereof, having a solids content of from about 5 to about 20% by weight is first prepared and the shaped article is formed therefrom.

Depending on the manner of preparation and shaping, the as formed articles of PBT typically possess a tenacity in the range of from about 8 to about 12 g./den., a modulus in the range of from about 500 to about 1000 g./den. and an elongation in the range of from about 2 to about 4%.

In accordance with the present invention, heat treatment of a shaped article of PBT is achieved by heating the article to a temperature in the range of from about 375° to about 650° C., preferably from about 450° to about 550° C. While the article is heated, it is stretched to obtain a stretch of from about 0.5 to about 6%, preferably from about 1 to about 4.0%. Heating and stretching of the article is performed for a very short time, typically lasting only from about 5 to about 300 seconds, preferably from about 30 to about 120 seconds. The length and conditions of the treating cycle naturally vary depending on the nature of the article, but in any event enable significant improvements to be obtained on a continuous basis.

By treating articles in accordance with this process, tenacity may be increased by from about 50 to about 100% into a range of from about 12 to about 30 g./den. Additionally, the modulus of the article may be increased by from about 100 to about 200% to from about 1000 to about 3000 g./den. and the elongation may be decreased to from about 100 to about 200% into a range of from about 0.5 to about 2.0%.

Shaped articles treated according to the present invention possess excellent mechanical properties which, in conjunction with the high thermo-oxidative resistance possessed by PBT, makes such articles eminently suitable for applicability in aerospace vehicles. In this regard, treated articles of unreinforced PBT may be used to replace known fiber reinforced composites and yet exhibit superior thermo-oxidative resistance.

To obtain a more complete understanding of the present invention, the following examples of preparing PBT, forming shaped articles and heat treating the same are set forth. In the examples, percentages of components are determined on a weight basis. It should be understood, however, that the invention is not limited to the specific details set forth therein.

EXAMPLE 1

Preparation of PBT

Polyphosphoric acid is made from phosphorus pentoxide and 85% phosphoric acid and 2,5-diamino-1,4-benzenedithiol dihydrochloride is added. The reaction mixture is stirred and heated to 70° C. until HCl evolution ceases. Powdered terephthalic acid is added as is additional polyphosphoric acid to ensure that all reactants are in solution. The reaction is heated to 180° C. and maintained at that temperature for 18 hours. After the reaction is completed, the hot mixture is slowly allowed to drip into a blender filled with water to chop and precipitate the polymer. The polymer is washed several times with water and dried in a vacuum oven. The intrinsic viscosity is 18 dl./g. in methanesulfonic acid.

Formation of Shaped Articles

Using PBT prepared in accordance with the described process (having an intrinsic viscosity of 18 dl./g.), an 11% by weight solids dope of the polymer in 97.5% methanesulfonic acid and 2.5% chlorosulfonic acid is spun into yarn at room temperature using a five hole dry jet having a hole diameter of 0.076 mm and an air gap of 1.5 cm. The polymer is coagulated using an aqueous bath of 50% methanesulfonic acid maintained at a temperature of 24° C.

Portions of the thusly spun yarn are tested with respect to tenacity, elongation and modulus and the average value is set forth below in Table I.

TABLE I

| Example | Denier per filament | Tenacity (g./den.) | Elongation (%) | Modulus (g./den.) |
|---|---|---|---|---|
| 1 | 1.7 | 10.8 | 1.8 | 1140 |
| 2 | 3.2 | 10.4 | 3.1 | 910 |
| 3 | 1.9 | 10.7 | 2.0 | 1030 |
| 4 | 2.5 | 9.7 | 1.8 | 1060 |
| 5 | 2.3 | 9.4 | 1.9 | 1020 |
| 6 | 2.1 | 9.7 | 1.3 | 1060 |
| 7 | 2.0 | 9.5 | 1.3 | 1060 |

Heat Treatment

Short lengths of PBT yarn (0.5–1.0 m.) are tied to leaders and passed through an oven at temperatures of 425°, 475° and 525° C. Minimum tension is placed on the yarn.

The oven is a circulating hot nitrogen system having an overall length of 2.69 m. The oven possesses flat plate heaters 1.93 m. long and contains a flattened stainless steel tube which is fed nitrogen in three locations, the nitrogen exiting from the ends of the tube.

The yarn is passed through the oven at a speed of 3.6 m./min. thereby yielding a residence time of about 32 seconds. The heat treated yarn is compared with the as-spun yarn. The results are set forth below in Table II.

TABLE II

| Example | Oven Temp. (°C.) | Denier per Filament | Tenacity (g./den.) | Elongation (%) | Modulus (g./den.) |
|---|---|---|---|---|---|
| 8 | As-spun yarn | 1.6 | 10.8 | 2.9 | 1000 |
| 9 | 425 | 1.5 | 12.5 | 0.78 | 1540 |
| 10 | 475 | 1.7 | 14.6 | 0.94 | 1650 |
| 11 | 525 | 1.6 | 15.6 | 1.1 | 1520 |

Further portions of the yarn of Example 8 are passed through the described oven for about 32 seconds at 475° C. under conditions yielding a 0.1% and 1% stretch. The average value is set forth below in Table III.

TABLE III

| Example | Stretch (%) | Denier per Filament | Tenacity (g./den.) | Elong. (%) | Modulus (g./den.) |
|---|---|---|---|---|---|
| 12 | 0.1 | 1.7 | 12.6 | 1.16 | 1300 |
| 13 | 1.0 | 1.7 | 13.6 | 0.98 | 1480 |

Based on the foregoing results, a larger amount of PBT yarn is prepared by the previously described procedure and heat treated at 475° C. for about 32 seconds under a 1% stretch. The properties of the first, middle and end portions of the yarn on the basis of the average value of ten breaks is set forth below in Table IV.

TABLE IV

| Example | Stretch (%) | Denier per Filament | Tenacity (g./den.) | Elong. (%) | Modulus (g./den.) |
|---|---|---|---|---|---|
| 14 | 1.0 | 1.8 | 13.5 | 1.1 | 1410 |
| 15 | 1.0 | 1.9 | 13.6 | 1.1 | 1380 |
| 16 | 1.0 | 1.7 | 12.9 | 1.0 | 1300 |

Compared to the as-spun yarn, heat treatment of this yarn causes the average value of tenacity to increase from 9.6 to 13.6 g./den., modulus to increase from 1060 to 1380 g./den. and elongation to decrease from 1.3 to 1.1%.

EXAMPLES 17–20

Samples of yarn from Example 7 having an intrinsic viscosity of 18 dl./g. in methanesulfonic acid are washed with aqueous ammonia in order to neutralize any residual acidity and are then extensively rewashed with deionized water to eliminate any residual base. These samples along with unneutralized samples are heat treated in the previously described oven under nitrogen at 475° or 525° C. for 32 seconds to yield the results set forth in Table V.

TABLE V

| Neutralized Yes/No | Temp (°C.) | Stretch (°C.) | Den. | Tenacity (g./den.) | Elongation (%) | Modulus (g./den.) |
|---|---|---|---|---|---|---|
| no | 475 | high | 1.8 | 13.6 | 0.88 | 1740 |
| no | 525 | 1.1 | 1.9 | 13.4 | 0.88 | 1730 |
| yes | 475 | 1.7 | 1.8 | 14.1 | 0.90 | 1680 |
| yes | 525 | 1.4 | 1.8 | 13.9 | 0.89 | 1890 |

Although the neutralized samples have slightly better properties, the residual acid (solvent) content of the fibers prior to neutralization apparently is sufficiently low to be ignored.

EXAMPLES 21–24

Additional PBT having an intrinsic viscosity of 31 dl./g. in methanesulfonic acid is prepared. The polymer is ground to increase its surface area and is solutioned at 8% solids in a mixture of 97.5% methanesulfonic acid/2.5% chlorosulfonic acid. The thusly formed dope is extruded through a 5 hole 76 μm jet with a 1.5 cm air gap into a 50% methanesulfonic acid/50% water coagulant bath. A spin-draw ratio of 2.1 was used. The resulting properties of this sample (Sample A) are: Denier/Tenacity/Elongation/Modulus=2.5/10.5/3.4/822. In this form, Tenacity and Modulus are in grams/denier and Elongation is in %. A second sample (Sample B) is heated identically except for a coagulant bath composition of 62.5% methanesulfonic acid/37.5% water and results in Denier/Tenacity/Elongation/Modulus=2.6/10.0/2.7/906.

Heat Treatment

Samples A and B are subjected to heat treatment in the previously described oven with a nitrogen atmosphere. The conditions of heat treatment and the resulting properties are set forth in Table IV.

TABLE VI

| Example | Sample | Temp. (°C.) | Time (sec.) | Stretch (%) | Den. | Tenacity | E-long. | Modulus |
|---|---|---|---|---|---|---|---|---|
| 21 | A | 475 | 32 | 1.4 | 2.3 | 11.7 | 0.86 | 1590 |
| 22 | B | 475 | 32 | 1.4 | 2.2 | 10.8 | 0.72 | 1550 |
| 23 | B | 475 | 66 | 1.2 | 2.1 | 13.0 | 0.98 | 1510 |

TABLE VI-continued

| Example | Sample | Temp. (°C.) | Time (sec.) | Stretch (%) | Den. | Tenacity | E-long. | Modulus |
|---|---|---|---|---|---|---|---|---|
| 24 | B | 525 | 32 | 1.4 | 2.2 | 13.0 | 0.91 | 1560 |

EXAMPLES 25–48

Another portion of PBT is prepared as a 12% solids solution in methanesulfonic acid. This is spun with a 5 hole, 76 μm. jet with a 1.5 cm air gap with a coagulant bath containing either 50% methanesulfonic acid/50% water or 62.5% methanesulfonic acid/37.5% water. Spin-draw ratios are 2.1 to 2.6. After washing with water and drying, the properties set forth in Table VII are obtained.

TABLE VII

| Sample | Coagulant (% MSA) | Den. | Tenacity (g./den.) | Elongation (%) | Modulus (g./den.) |
|---|---|---|---|---|---|
| A | 50 | 3.0 | 10.9 | 2.0 | 1100 |
| B | 50 | 3.0 | 11.4 | 2.4 | 920 |
| C | 62.5 | 3.8 | 12.5 | 2.1 | 1130 |
| D | 62.5 | 3.0 | 12.1 | 2.0 | 1050 |
| E | 62.5 | 3.0 | 12.4 | 1.9 | 1230 |

Heat Treatment

Samples A to E are subjected to heat treatment in the previously described oven with a nitrogen atmosphere. The conditions of heat treatment and the resulting properties are set forth in Table VIII.

TABLE VIII

| Example | Sample | Temp. (°C.) | Time (sec.) | Stretch (%) | Den. | Tenacity | E-long. | Modulus |
|---|---|---|---|---|---|---|---|---|
| 25 | A | 375 | 71 | 1.9 | 2.5 | 14.8 | 0.93 | 1920 |
| 26 | A | 425 | 71 | 1.9 | 2.6 | 15.1 | 0.86 | 1840 |
| 27 | A | 475 | 32 | 1.4 | 2.5 | 15.8 | 1.0 | 1870 |
| 28 | A | 475 | 64 | 1.7 | 2.5 | 15.6 | 0.89 | 1870 |
| 29 | A | 525 | 32 | 1.4 | 2.5 | 16.3 | 0.92 | 2030 |
| 30 | A | 525 | 64 | 1.7 | 2.6 | 16.1 | 0.96 | 1840 |
| 31 | B | 375 | 32 | 1.4 | 2.7 | 13.6 | 0.81 | 1780 |
| 32 | B | 425 | 32 | 1.4 | 2.6 | 15.0 | 0.90 | 1830 |
| 33 | B | 475 | 32 | 1.4 | 2.6 | 16.2 | 0.90 | 1990 |
| 34 | B | 475 | 64 | 1.7 | 2.6 | 15.8 | 0.87 | 1960 |
| 35 | B | 525 | 32 | 1.4 | 2.6 | 15.7 | 0.85 | 2000 |
| 36 | B | 525 | 64 | 1.7 | 2.5 | 14.7 | 0.82 | 1950 |
| 37 | C | 475 | 32 | 0.84 | 3.7 | 16.6 | 0.95 | 1970 |
| 38 | C | 475 | 64 | 1.7 | 3.1 | 17.9 | 1.0 | 1980 |
| 39 | C | 525 | 32 | 0.84 | 3.5 | 16.7 | 1.0 | 1930 |
| 40 | C | 525 | 64 | 1.7 | 3.1 | 18.0 | 0.99 | 2030 |
| 41 | D | 475 | 32 | 0.84 | 2.7 | 15.8 | 0.86 | 2000 |
| 42 | D | 475 | 64 | 1.7 | 2.6 | 15.2 | 0.81 | 2010 |
| 43 | D | 525 | 32 | 0.84 | 2.7 | 17.9 | 0.93 | 2130 |
| 44 | D | 525 | 64 | 1.7 | 2.7 | 17.4 | 0.85 | 2140 |
| 45 | E | 475 | 32 | 0.84 | 2.7 | 16.6 | 0.95 | 1980 |
| 46 | E | 475 | 64 | 1.7 | 2.7 | 16.8 | 0.85 | 2120 |
| 47 | E | 525 | 32 | 0.84 | 2.6 | 16.8 | 0.87 | 2110 |
| 48 | E | 525 | 64 | 1.7 | 2.6 | 18.3 | 0.94 | 2100 |

Thus, samples with as spun tenacities of 11 to 12 grams/denier have their tenacities raised by heat treatment to 15 to 18 grams/denier, their modulus raised from the 900 to 1200 grams/denier range to the 1800 to 2100 grams/denier range and their elongation decreased from about 2.0% to 1.0% or lower.

EXAMPLE 49

A small aliquot of a PBT reaction mixture in polyphosphoric acid having an intrinsic viscosity of 31 and a solids level of 5.6% is extruded using a 5 hole 200 m. jet. The sample is spun with an air gap of 7.6 cm into a coagulant bath containing 9% phosphoric acid/91% water. The temperature of the dope is 60° C. and a spin-draw ratio of 3.7 is employed. The resulting properties are: Denier/Tenacity/Elongation/Modulus=10.9/18.0/6.9/480.

Heat treatment of the yarn is performed in the previously described oven in a nitrogen atmosphere at 475° C. for 64 seconds and a 4% stretch to yield: Denier/Tenacity/Elongation/Modulus=8.8/20.6/1.2/1910.

EXAMPLES 50–64

A PBT reaction mixture in polyphosphoric acid having an intrinsic viscosity of 14 dl./g. in methanesulfonic acid and a solids level of 9.2% is extruded from a 20 hole 133 μm. hole size jet with a 10 cm. air gap into a coagulant bath containing 10% phosphoric acid/90% water using a spin-draw ratio of 4.3, the properties obtained after washing and drying are: Denier/Tenacity/Elongation/Modulus=6.3/12.1/3.4/810.

Heat Treatment

A second heat treatment oven is used. The oven is 1 meter long with hot nitrogen fed to the center and exiting from both ends. Using this oven, the results in Table IX are obtained upon heat treatment of the above precursor fiber.

TABLE IX

| Example | Temp. (°C.) | Time (sec.) | Stretch (%) | Den. | Tenacity (g./den.) | Elongation (%) | Modulus (g./den.) |
|---|---|---|---|---|---|---|---|
| 50 | 475 | 60 | 0 | 5.8 | 14.2 | 1.3 | 1030 |
| 51 | 475 | 30 | 2 | 4.8 | 18.0 | 0.97 | 2020 |
| 52 | 475 | 60 | 2 | 5.1 | 18.8 | 0.98 | 2080 |
| 53 | 475 | 120 | 3 | 4.7 | 18.6 | 0.88 | 2180 |
| 54 | 525 | 60 | 0 | 5.0 | 15.6 | 1.2 | 1340 |
| 55 | 525 | 30 | 2 | 5.4 | 18.8 | 1.1 | 1820 |
| 56 | 525 | 60 | 2 | 5.1 | 20.8 | 1.1 | 2100 |
| 57 | 525 | 120 | 3 | 5.0 | 19.2 | 1.0 | 2140 |
| 58 | 550 | 60 | 0 | 5.2 | 14.5 | 1.3 | 1140 |
| 59 | 550 | 30 | 2 | 4.9 | 19.8 | 1.1 | 1830 |
| 60 | 550 | 60 | 2 | 4.8 | 20.8 | 1.1 | 2140 |
| 61 | 575 | 60 | 0 | 5.0 | 12.8 | 1.1 | 1030 |
| 62 | 575 | 30 | 2 | 5.0 | 21.9 | 1.3 | 1840 |
| 63 | 575 | 60 | 2 | 5.1 | 23.0 | 1.3 | 1780 |
| 64 | 575 | 120 | 2 | 4.4 | 23.1 | 1.2 | 1880 |

EXAMPLES 65–69

Extrusion of a PBT reaction mixture in polyphosphoric acid containing 9.2% solids and having an intrinsic viscosity of 14 dl./g. in methanesulfonic acid is performed using a 0.5 inch wide die with a gap of 0.007 in. and a spin-draw ratio of 9. The film is coagulated in an aqueous bath and yields a film with a dry width of 4.5 mm., a denier of 440, a tenacity of 9.5 g./den., an elongation of 3.3% and a modulus of 720 g./den.

Heat Treatment

The above film is heat treated in a manner similar to fiber; by passing the film through the heated nitrogen filled oven while under tension. Results are shown in Table X.

TABLE X

| Example | Temp. (°C.) | Time (sec.) | Stretch (%) | Tenacity (g./den.) | Elongation (%) | Modulus (g./den.) |
|---|---|---|---|---|---|---|
| 65 | 525 | 60 | 2.0 | 14.2 | 1.9 | 910 |
| 66 | 525 | 120 | 2.0 | 15.1 | 2.0 | 880 |
| 67 | 525 | 120 | 2.5 | 16.1 | 1.8 | 970 |
| 68 | 525 | 120 | 3.0 | 16.6 | 1.8 | 1040 |

TABLE X-continued

| Example | Temp. (°C.) | Time (sec.) | Stretch (%) | Tenacity (g./den.) | Elongation (%) | Modulus (g./den.) |
|---|---|---|---|---|---|---|
| 69 | 525 | 120 | 3.5 | 16.7 | 1.8 | 1010 |

EXAMPLES 70-80

A sample of PBT polymer as an 8.7% solids dope in the polyphosphoric acid reaction mixture having an intrinsic viscosity of 24 dl./g. in methanesulfonic acid is extruded a 0.5 inch wide die with a 0.006 inch gap. Spin-draw ratios of 8 to 14 are used. Properties obtained are set forth in Table XI.

TABLE XI

| Sample | Denier | Tenacity (g./den.) | Elongation (%) | Modulus (g./den.) |
|---|---|---|---|---|
| A | 370 | 13.9 | 3.8 | 680 |
| B | 300 | 17.8 | 5.1 | 620 |
| C | 210 | 18.0 | 3.9 | 760 |
| D | 290 | 19.4 | 4.7 | 720 |
| E | 340 | 20.7 | 4.7 | 780 |
| F | 280 | 21.2 | 4.9 | 760 |

Heat Treatment

Samples A–F are heat treated in the second oven under nitrogen at 525° C. for 120 seconds. At the indicated stretch values, the results are set forth in Table XII.

TABLE XII

| Example | Sample | Time (sec.) | Stretch (%) | Tenacity (g./den.) | Elongation (%) | Modulus (g./den.) |
|---|---|---|---|---|---|---|
| 70 | A | 120 | 2.0 | 16.9 | 2.1 | 910 |
| 71 | B | 120 | 2.0 | 18.1 | 2.2 | 1000 |
| 72 | C | 120 | 2.0 | 19.7 | 2.0 | 1120 |
| 73 | C | 120 | 2.5 | 20.7 | 2.0 | 1170 |
| 74 | C | 120 | 2.6 | 20.6 | 1.9 | 1200 |
| 75 | D | 120 | 2.0 | 17.4 | 2.1 | 1000 |
| 76 | D | 120 | 2.5 | 17.7 | 2.0 | 1000 |
| 77 | E | 120 | 2.0 | 13.9 | 1.3 | 1300 |
| 78 | E | 120 | 2.5 | 15.7 | 1.4 | 1410 |
| 79 | F | 120 | 2.0 | 15.9 | 1.4 | 1390 |
| 80 | F | 120 | 2.5 | 15.0 | 1.2 | 1520 |

Thus, as may be seen from the foregoing examples, significant improvement in the properties of shaped articles of PBT may surprisingly be obtained in short periods of time thereby permitting treatment to be performed on a continuous basis. As stated earlier, such treated articles may be employed as a superior substitute for fiber reinforced composite in aerospace vehicles.

Although the invention has been described with preferred embodiments, it is to be understood that variations and modifications may be resorted to as will be apparent to those skilled in this art. Such variations are to be considered within the scope of the following claims.

I claim:

1. A process for heat treating a shaped article of poly{[benzo(1,2-d:4,5-d')bisthiazole-2,6-diyl]-1,4-phenylene}, its cis isomer or mixtures thereof on a continuous basis comprising:
   (a) heating the article to a temperature in the range of from about 375° to about 650° C.;
   (b) stretching the article to obtain a stretch of from about 0.5 to about 4%; and
   (c) maintaining the article under the conditions of (a) and (b) for from about 5 to about 300 seconds.

2. The process of claim 1 wherein the heating of the article is performed in substantially inert atmosphere.

3. The process of claim 2 wherein the heating of the article is performed in a substantially inert atmosphere composed of nitrogen.

4. The process of claim 1 wherein the poly{[benzo(1,2-d:4,5-d')bisthiazole-2,6-diyl]-1,4-phenylene}, its cis isomer or mixtures thereof is fully polymerized prior to heating the article.

5. The process of claim 1 wherein the heat treated article has a modulus in the range of from about 1000 to about 3000 g./den., a tenacity in the range of from about 12 to about 30 g./den. and an elongation in the range of from about 0.5 to about 2.0%.

6. The process of claim 1 wherein the article is heated to a temperature in the range of from about 450° to about 550° C. stretched to obtain a stretch of from about 1 to about 4% and maintained under those conditions for from about 30 to about 120 seconds.

7. A process for preparing heat treated shaped articles of poly{[benzo(1,2-d:4,5-d')bisthiazole-2,6-diyl]-1,4-phenylene}, its cis isomer or mixtures thereof on a continuous basis comprising:
   (a) dissolving

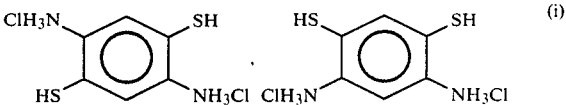

(i)

or mixtures thereof, and

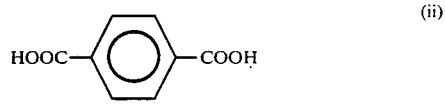

(ii)

in polyphosphoric acid in about equimolar amounts of (i) to (ii);
   (b) reacting (i) and (ii) at a temperature in the range of from about 150° to about 200° C. to obtain a polymer having the recurring unit

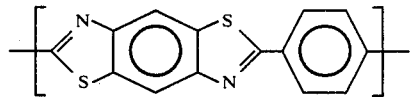

or

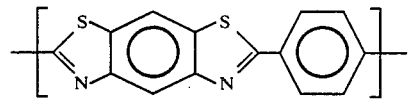

or mixtures thereof;
   (c) forming a shaped article from the polymer;
   (d) heating the article to a temperature in the range of from about 375° to about 650° C.;
   (e) stretching the article to obtain a stretch of from about 0.5 to about 4% and
   (f) maintaining the article under the conditions of (d) and (e) for from about 5 to about 300 seconds.

8. The process of claim 7 wherein the reaction of (i) and (ii) is performed in a substantially inert atmosphere.

9. The process of claim 7 wherein the steps of (d), (e) and (f) are performed in a substantially inert atmosphere.

10. The process of claims 8 or 9 wherein the atmosphere is composed of nitrogen.

11. The process of claim 7 wherein the heat treated article has a modulus in the range of from about 1000 to about 3000 g./den., a tenacity in the range of from about 12 to about 30 g./den. and an elongation in the range of from about 0.5 to about 2.0%.

12. The process of claim 7 wherein the article is heated to a temperature in the range of from about 450 to about 550° C., stretched to obtain a stretch of from about 1 to about 4% and maintained under those conditions for from about 30 to about 120 seconds.

* * * * *